United States Patent
Yamaguchi et al.

(10) Patent No.: US 6,374,172 B1
(45) Date of Patent: Apr. 16, 2002

(54) VEHICLE DRIVING CONDITION DETECTION DEVICE

(75) Inventors: Hiroyuki Yamaguchi; Katsuhiro Asano; Yasushi Amano, all of Aichi-ken; Kenji Tozu, Mie-ken; Akitaka Nishio, Aichi-ken, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/684,923

(22) Filed: Oct. 10, 2000

(30) Foreign Application Priority Data

Oct. 7, 1999 (JP) ............................................. 11-287368

(51) Int. Cl.[7] ............................. B60T 8/24; B60T 8/58; G01P 15/00; B62D 6/00; G01C 9/06
(52) U.S. Cl. ............................. 701/90; 701/72; 701/101
(58) Field of Search ............................. 701/36, 41, 42, 701/69, 70, 71, 72, 82, 90, 91, 101; 340/438, 440; 180/421, 422, 446; 280/5.51, 211

(56) References Cited

U.S. PATENT DOCUMENTS

| 4,706,771 A | * 11/1987 | Kawabe et al. ................ 701/42 |
| 5,418,723 A | * 5/1995 | Reichelt et al. ................ 701/41 |
| 5,925,083 A | * 7/1999 | Ackermann ................... 701/41 |
| 6,128,569 A | * 10/2000 | Fukushima ................... 701/90 |

FOREIGN PATENT DOCUMENTS

| JP | 8-332934 | 12/1996 | | |
| JP | 10-264796 A | * 10/1998 | ................... | 701/90 |
| JP | 10-273031 A | * 10/1998 | ................... | 701/90 |

* cited by examiner

Primary Examiner—Willis R. Wolfe
(74) Attorney, Agent, or Firm—Burns, Doane, Swecker & Mathis, LLP (57) ABSTRACT

A vehicle driving condition detection device is adapted to detect a vehicle running along a banked or laterally sloping road, as well as a lateral acceleration, and sideslip angle with good accuracy. The sideslip angle is estimated at a vehicle-body sideslip angle estimating circuit based on a steering angle $\delta f$, a lateral acceleration $\ddot{y}$, a yaw rate $\theta$, and a vehicle speed V. In addition, using a differentiating device, the estimated sideslip angle is differentiated to calculate a slip angular velocity. A subtracting device is provided at which a deviation is calculated between the slip angular velocity and a slip angular velocity detected at a slip angular velocity calculating circuit. The deviation can detect a banked or laterally sloping road due to the fact that the detected slip angular velocity at the slip angular velocity calculating circuit includes the gravity acceleration component that depends on the slope or bank of the road. Upon detecting a banked or sloping road, a deviation $\Delta \ddot{y} (=\theta \cdot V - \ddot{y})$ is outputted from a switching device, and at a subtracting device the detected lateral acceleration $\ddot{y}$ is corrected by being subtracted with the deviation $\Delta \ddot{y}$. On the basis of the resultant or corrected lateral acceleration $\ddot{y}$, the vehicle-body sideslip angle is estimated. Such an estimation is made irrespective of the slope or bank of the road.

5 Claims, 9 Drawing Sheets

VEHICLE DRIVING CONDITION DETECTION DEVICE

This application is based on and claims priority under 35 U.S.C. § 119 with respect to Japanese Application No. 11(1999)-287368 filed on Oct. 7, 1999, the entire content of which is incorporated herein by reference.

FIELD OF THE INVENTION

The present invention generally relates to a vehicle driving condition detection device. More particularly, the present invention pertains to a device for detecting lateral acceleration and sideslip angle of a vehicle.

BACKGROUND OF THE INVENTION

Determining or measuring the vehicular sideslip angle is important from the standpoint of assessing a vehicle's traveling direction. A ground vehicle speed sensor has been used to determine or measure the vehicular sideslip angle. However, the sensors can be relatively expensive and so efforts have been made to determine or measure the vehicular sideslip angle using a more inexpensive sensor.

Japanese Unexamined Patent Publication No. Hei. 8 (1996)-332934 discloses an idea for enhancing the estimating precision of the vehicle body sideslip angle by improving the road slant estimation precision. In this document, the calculation of the lateral slope of the road is as follows. On the basis of the vehicle model, the changing rate of the lateral speed of vehicle is estimated which is the product of the vehicle speed V and the slip angular velocity. A lateral acceleration deviation is calculated by subtracting the lateral acceleration Gy from the product of the vehicle speed V and the yaw rate Y. The lateral acceleration deviation is added with the aforementioned estimated lateral speed changing rate and the low frequency component of the resulting sum is calculated as the quantity of the road slant.

However, in this system, the vehicle-body sideslip is derived from the road slant quantity which is calculated using the lateral speed changing rate or the slip angular velocity on the basis of the vehicle model, which results in that in addition to the lateral slope quantity modeling errors are included. Thus, even when the vehicle runs along a flat road, in addition to when the vehicle runs along a slanted or banked road such as a banked road, there is a concern with respect to a reduced precision in estimating vehicle body sideslip.

A need thus exists for a vehicle driving condition detection device which is capable of detecting vehicle driving condition quantities or variables such as sideslip angle with a relatively high accuracy irrespective of road surface conditions.

SUMMARY OF THE INVENTION

The vehicle driving condition detection device of the present invention includes a vehicle-body sideslip angle estimating device for estimating the vehicle-body sideslip angle on the basis of a vehicle motion model which depends on road surface slip conditions, a detecting device which detects whether or not the vehicle is running on a laterally sloping or banked road based on deviation between a detected slip angular velocity and a calculated slip angular velocity determined based on the estimated vehicle-body sideslip angle estimated by the vehicle-body sideslip angle estimating device, and a correction device for correcting a detected lateral acceleration when the detecting device detects that the vehicle is running on a banked or sloping road.

The vehicle-body sideslip angle estimating device is adapted to estimate the vehicle-body sideslip angle on the basis of the corrected lateral acceleration determined by the correction device. The detection device includes: a differentiating device in which the estimated vehicle-body sideslip angle determined by the vehicle-body sideslip angle estimating device is differentiated with respect to time; a slip angular velocity detecting device which detects a slip angular velocity on the basis of the detected lateral acceleration, a detected yaw rate, and a detected vehicle speed; a subtracting device which performs a subtraction between a slip angular velocity calculated at the differentiating device and the slip angular velocity detected at the slip angular velocity detecting device; and a comparing device which makes a comparison between the deviation calculated at the subtracting device and a threshold value.

The correction device is adapted to make a correction of the lateral acceleration in such a manner that a deviation between the detected lateral acceleration and a product of the detected yaw rate and the detected vehicle speed is subtracted from the detected lateral acceleration. The correction means is also adapted to correct the detected lateral acceleration on the basis of a gravity acceleration along a vehicle vertical direction.

In the present invention, detecting the slope or bank of the road and correcting the detected values such as lateral acceleration on the banked road are made separately. In detail, the detection of the banked or sloping road is made based on the deviation between the actually detected slip angular velocity and the calculated slip angular velocity derived from the vehicle-body sideslip angle on the basis of the vehicle mode. The slip angle based on the road surface condition depended on vehicle motion model does not include errors resulting from the road surface slip, but includes a constant value (DC component) error resulting from the sloped or banked nature of the road. Thus, the slip angular velocity as the change of the slip angle with the passage of time does not include such a DC error. On the other hand, the sensor detected slip angular velocity includes a DC error resulting from the slope or bank of the road. Thus, the deviation between both the slip angular velocities indicates DC error components as an indication of the sloping or banked nature of the road, which results in that irrespective of road surface condition, the sloped or banked road condition can be detected with very good or highly accurate precision. Upon detecting the laterally sloping or banked road, for example, the DC error component included in the detected lateral acceleration is calculated by obtaining the deviation between the detected lateral acceleration and the product of the detected yaw rate and detected vehicle speed. Subtracting the resulting DC error component from the detected lateral acceleration brings in the correction of the detected lateral acceleration. Though the deviation between the detected lateral acceleration and the product of the detected yaw rate and detected vehicle speed is the DC error component of the lateral acceleration which results from the slope of the road, an error component of the lateral acceleration may sometimes be found when the road surface is in a slip condition even though the road is a flat road. Thus, if a structure is employed wherein the lateral acceleration is always made to be corrected by calculating the lateral acceleration deviation, an erroneous correction would be made on the flat road. In the present invention, detecting the sloped or banked road is made with very high accuracy or precision, only when the slope of the road becomes obvious the detected lateral acceleration is brought into correction, which prevents erroneous correction. As a result, the detection of the lateral acceleration can be made with very high precision even when on a banked or sloping road in addition to when on a flat road.

To obtain the slip angular velocity from the slip angle which is estimated on the basis of the road surface condition dependent on the vehicle motion model, for example, it is possible to employ differentiation of the slip angle with respect to time in the differentiating device, which eliminates the DC error component in the estimated slip angle. In addition, the slip angular velocity can be calculated by substituting the sensor detected lateral acceleration, yaw rate, and vehicle speed into the related formula. Due to the fact that the deviation between both slip angles increases in proportion to the increase of the angle of road slope or bank, comparing the deviation with the predetermined threshold value makes it possible to recognize whether or not the road is a banked road or a road with a slope.

The lateral acceleration corrected in accordance with the present invention can be used, say, for estimating the sideslip angle, which makes it possible to estimate the sideslip angle on not only a flat road but a banked or sloping road as well. Although making an estimation of the sideslip angle by using lateral acceleration before it's correction the resultant estimated value includes an error component, making an estimation of the sideslip angle by using lateral acceleration after it's correction, the resultant estimated sideslip angle becomes free from the sloping or banked road and is very high in precision.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
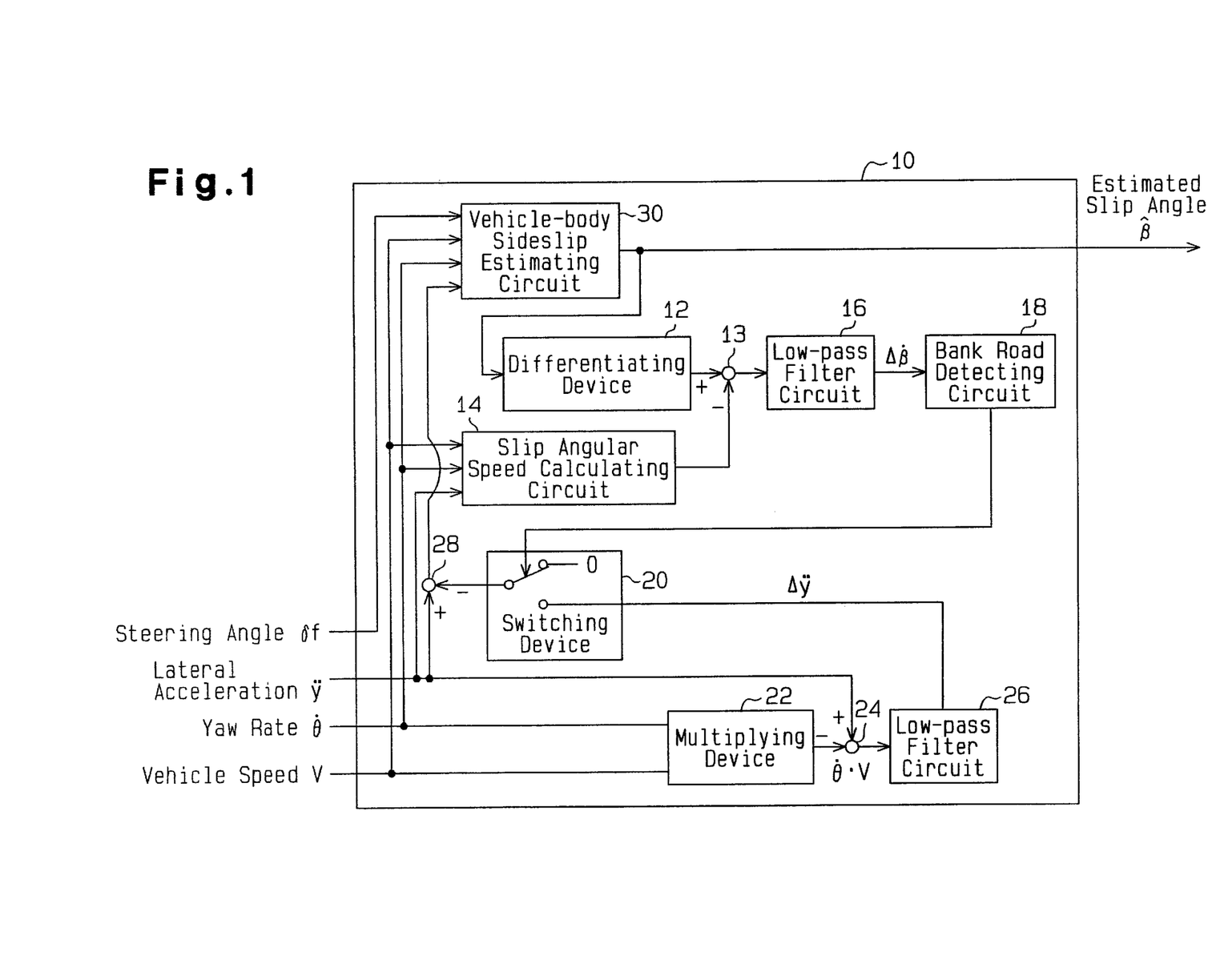
FIG. 1 is a schematic diagram of a vehicle driving condition detection device in accordance with the present invention.

The vehicle driving condition detecting device of the present invention estimates vehicle-body sideslip on the basis of lateral acceleration. With reference to FIG. 1, the vehicle driving condition detection device 10 includes a vehicle-body sideslip angle estimating circuit 30 to which is fed various signals indicative of a steering angle $\delta f$, a lateral acceleration $\ddot{y}$, a yaw rate $\dot{\theta}$, and a vehicle speed V. The steering angle $\delta f$, lateral acceleration $\ddot{y}$, yaw rate $\dot{\theta}$, and vehicle speed V are detected by a steering sensor, a lateral acceleration sensor, a yaw rate sensor, and a vehicle speed sensor, respectively.

The vehicle-body sideslip angle estimating circuit 30 is designed to estimate the vehicle-body sideslip angle on the basis of the vehicle model which takes into consideration road slipping conditions. As an example of such a vehicle-body sideslip angle estimating circuit 30, the vehicle motion model disclosed in Japanese Patent Laid-Open Print (Unexamined Patent Publication) No. Hei. 9(1997)-311042 and known to persons skilled in the art can be employed.

Figure 2:
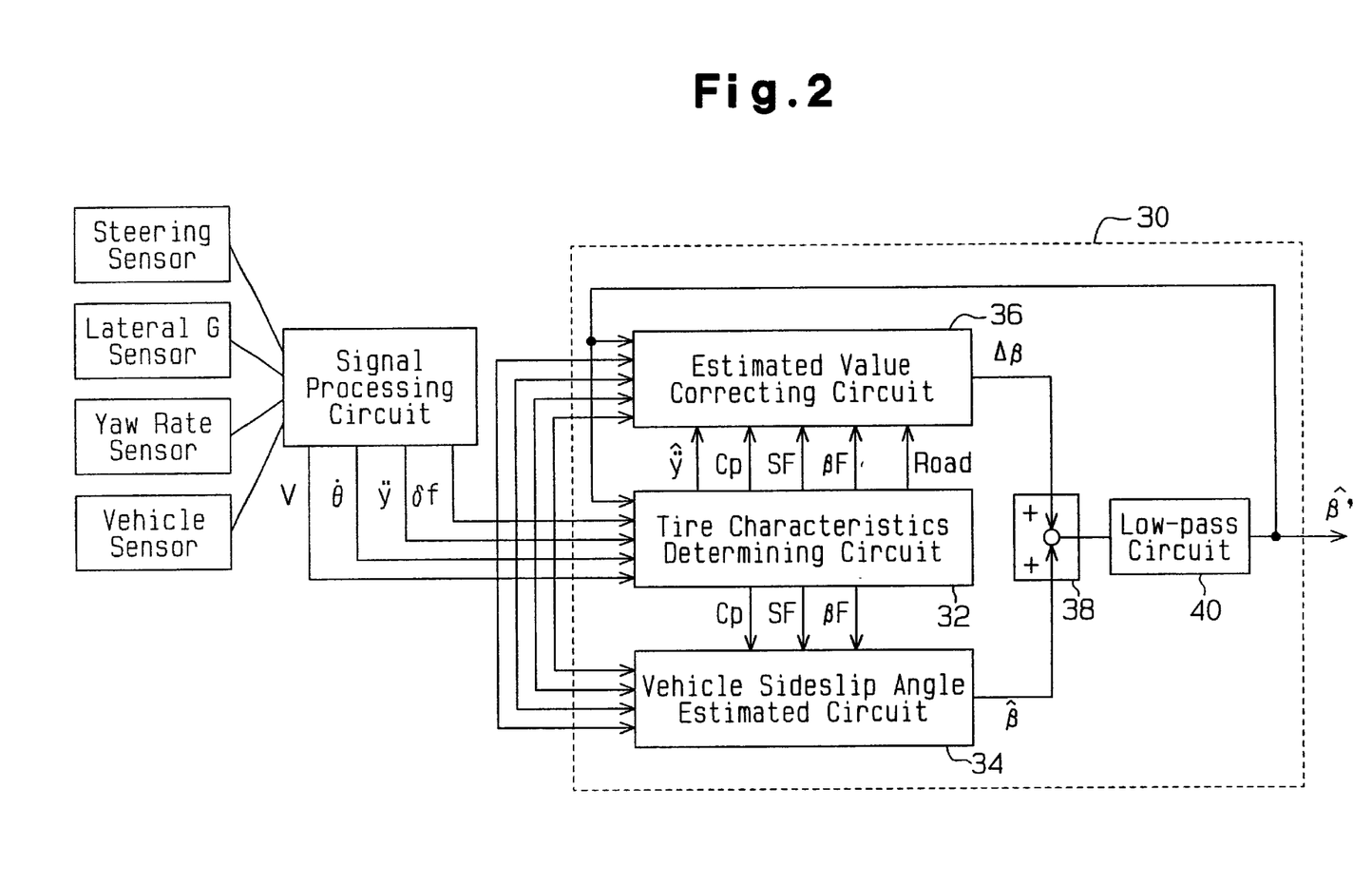
FIG. 2 is a block diagram of a vehicle-body sideslip angle estimating circuit of the device illustrated in FIG. 1.

FIG. 2 illustrates a block diagram of the vehicle-body sideslip angle estimating circuit 30. The vehicle-body sideslip angle estimating circuit 30 is made up of a tire characteristics determining circuit 32, a vehicle-sideslip angle estimation circuit 34, an estimated value correcting circuit 36, an adder 38, and a low-pass filter 40. The tire characteristics determining circuit 32 makes a judgment of the road surface on the basis of the steering angle $\delta f$, the lateral acceleration $\ddot{y}$, the yaw rate $\dot{\theta}$, and the vehicle speed V. On the basis of the result of the road surface judgment, the output value of the circuit 30, the steering angle $\delta f$, the yaw rate $\dot{\theta}$, and the vehicle speed V, the tire characteristics determining circuit 32 selects the tire characteristics for each of the front and rear wheels.

Based on the selected tire characteristics, a tire cornering power Cp, a cornering force SF, and a tire slip angle $\beta F$ of each of the front and rear wheels are outputted from the tire characteristics determining circuit 32 to both of the vehicle-sideslip angle estimation circuit 34 and the estimated value correcting circuit 36. In addition, the tire characteristics determining circuit 32 feeds the road surface judgment result road to the estimated value correcting circuit 36.

The vehicle-sideslip angle estimation circuit 34 calculates a vehicle-body side slip angle estimation value according to a motion equation using the steering angle $\delta f$, the lateral acceleration $\ddot{y}$, the yaw rate $\dot{\theta}$, the vehicle speed V, and the tire's non-linear parameters Cp, SF, and $\beta F$. The resulting vehicle-body side slip angle estimation value $\hat{\beta}$ is fed to the adder 38.

The estimated value correcting circuit 36 calculates a correction value $\Delta \beta$ of the vehicle-body sideslip angle on the basis of the output value of the circuit 30, the steering angle $\delta f$, the yaw rate $\dot{\theta}$, the lateral acceleration $\ddot{y}$, the vehicle speed V, the tire's non-linear parameters Cp, SF, and $\beta F$, and the road surface judgment result. The resulting correction value $\Delta \beta$ is fed to the adder 38.

The adder 38 adds the vehicle-body sideslip angle estimation value $\hat{\beta}$ and the correction value $\Delta \beta$ and feeds the result to the low-pass filter 40. The low-pass filter 40 deletes high frequency noise from the added value fed from the circuit 34 and the result is outputted, as an ultimate or formal vehicle-body side slip angle estimation value $\hat{\beta}'$, from the adder 38.

Figure 3:
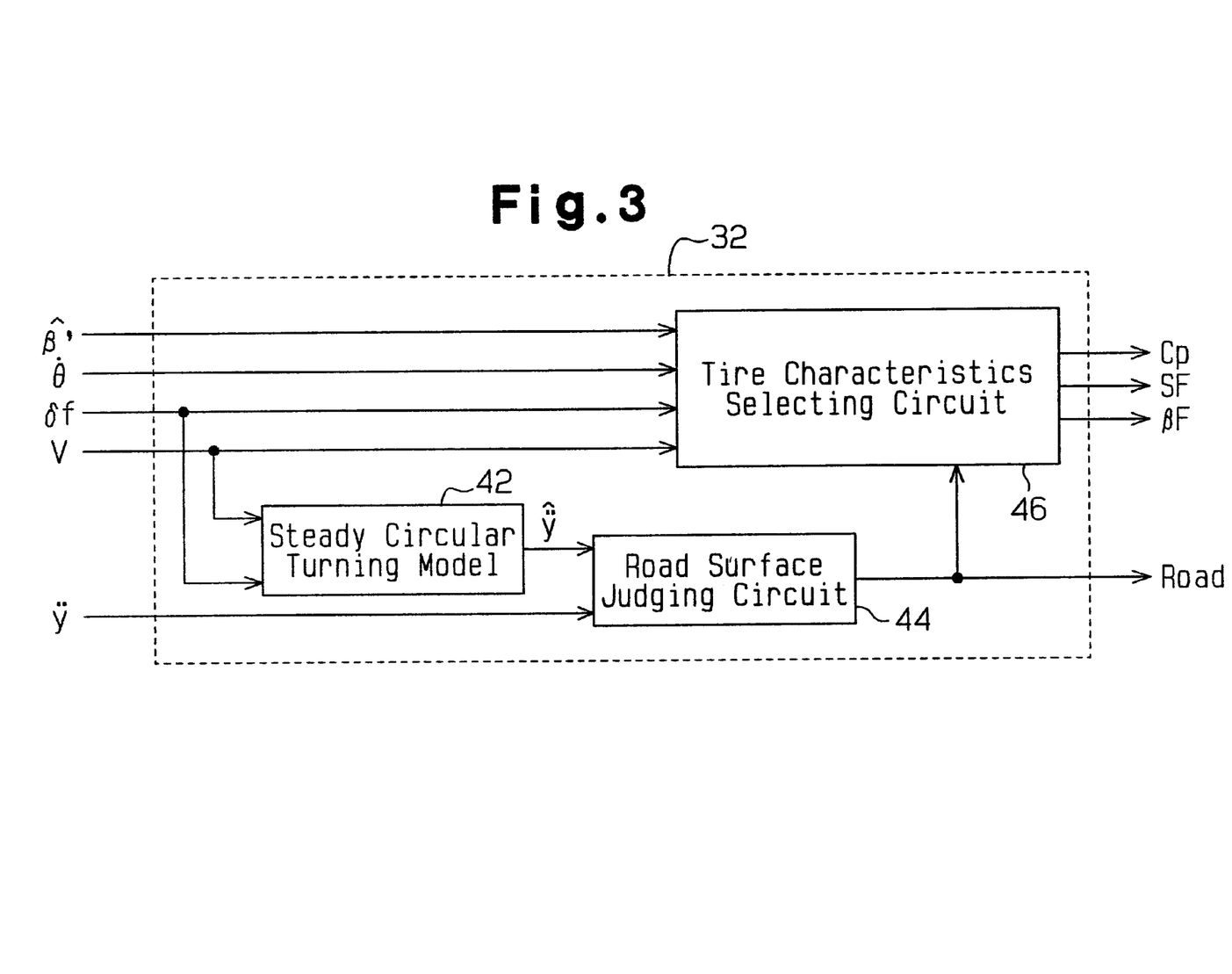
FIG. 3 is a block diagram of a tire characteristics determining circuit of the circuit illustrated in FIG. 2.

Referring to FIG. 3, which illustrates in block diagram form the tire characteristics determining circuit 32, the tire characteristics determining circuit 32 is made up of a steady circular turning model 42, a road surface judging circuit 44, and a tire characteristics selecting circuit 46.

The steady circular turning model 42 issues a model value of lateral acceleration (lateral G) to the road surface judging circuit 44 on the basis of the steering angle δf, the vehicle speed V, and other vehicle-body related constant values. Examples of vehicle-body related constant values are: vehicle weight=1450 kg, yaw inertia moment=3709 kg·m², front wheel cornering power Cr=2×33991 N/rad, rear wheel cornering power Cr=2×570970 N/rad, distance Lf between the front wheel and center of gravity=1.276 m, distance Lr between the rear wheel and center of gravity=1.414 m, distance Lx between the rear wheel and the lateral acceleration sensor=1.3 m, and the front wheel gear ratio Gr=14.5. Of course, these values are exemplary in nature, it being understood that other suitable values can be employed.

The road surface judging circuit 44 tire characteristics selecting circuit 46 compares the model value of lateral G of the steady circular turning model 42 with the detected lateral acceleration $\ddot{y}$ to judge whether the road surface is one of dry, wet, snowy, icy, and so on and outputs the result as the road surface judgment result Road.

On the basis of the road surface judgment result Road, the characteristics selecting circuit 46 select one of various prepared road surface conditions depending on tire characteristics parameter tables and determines the non-liner parameters Cp, SF, and βF of each of the front and rear wheels according to the tire slip angle calculated from the steering angle δf, the yaw rate $\dot{\theta}$, and the vehicle speed V.

Figure 4:
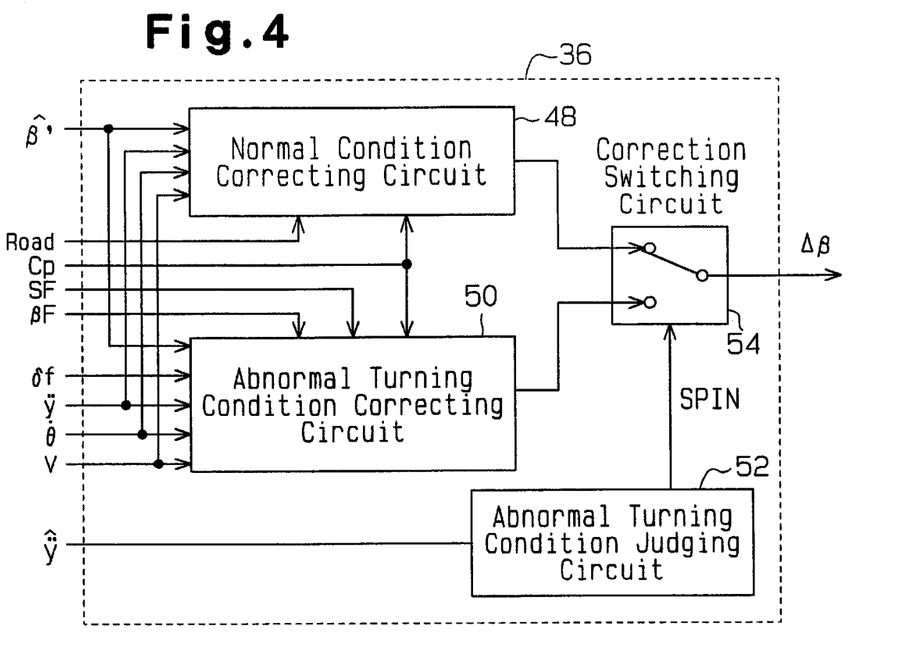
FIG. 4 is a block diagram of an estimated value correcting circuit of the circuit illustrated in FIG. 2.

Referring to FIG. 4 which illustrates a block diagram of the estimated value correcting circuit 36 shown in FIG. 2, the estimated value correcting circuit 36 includes a normal condition correcting circuit 48, an abnormal turning condition correcting circuit 50, an abnormal turning condition judging circuit 52, and a correction switching circuit 54. It is to be noted that "normal condition" means a condition of the vehicle after lane change completion and just before abnormal turning condition, and the phrase "abnormal turning condition" means "an unstable vehicle traveling condition upon turning movement which results from over steering operation".

Figure 5:
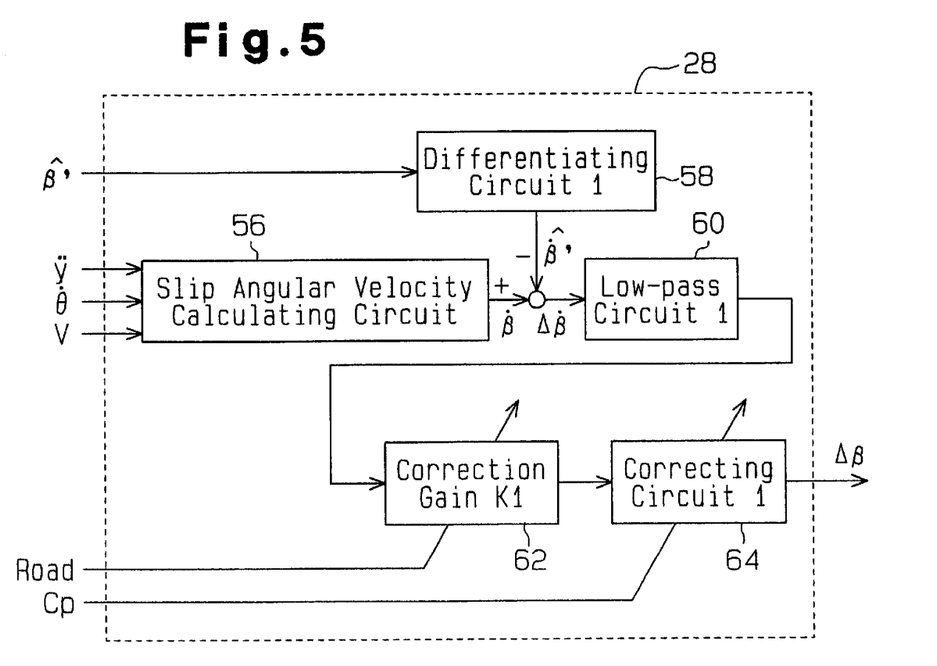
FIG. 5 is a block diagram of a normal condition correcting circuit of the circuit illustrated in FIG. 4.

FIG. 5 illustrates a block diagram of the normal condition correcting circuit 48. The normal condition correcting circuit 48 is made up of a slip angular velocity calculating circuit 56, a differentiating circuit 58, a low-pass filter 60, a correction gain 62, and a correction circuit 64. The slip angular velocity calculating circuit 56 calculates a slipping angular velocity $\dot{\beta}=d\beta/dt$ on the basis of the values $\ddot{y}$, $\dot{\theta}$, V, and the related formulas.

The differentiating circuit 58 calculates an estimated value of slip angular velocity by differentiating the output value of the vehicle-body sideslip estimating circuit 30 with respect to time and calculates a slip angular velocity error $\Delta\dot{\beta}$, which is a deviation between the resultant estimated value of the slip angular velocity and the slip angular velocity $\dot{\beta}$, to output to the low-pass filter circuit 60.

The low-pass filter feeds the slip angular velocity error $\Delta\dot{\beta}$ after eliminating therefrom sensor noise and the foregoing differentiating operation.

The correction gain K1 is a variable gain which depends on the aforementioned road surface judgment result Road and a smaller gain K1 is selected as the road surface friction coefficient μ becomes smaller. A product of the low-pass filtered angular velocity error $\Delta\dot{\beta}$ and the correction gain K1 is obtained and is fed to the correction circuit 64.

The correction circuit 64 calculates a normal condition estimated correction value Δβ based on the resulting product, the tire nonlinear parameter Cp, and the vehicle mass m.

Figure 6:
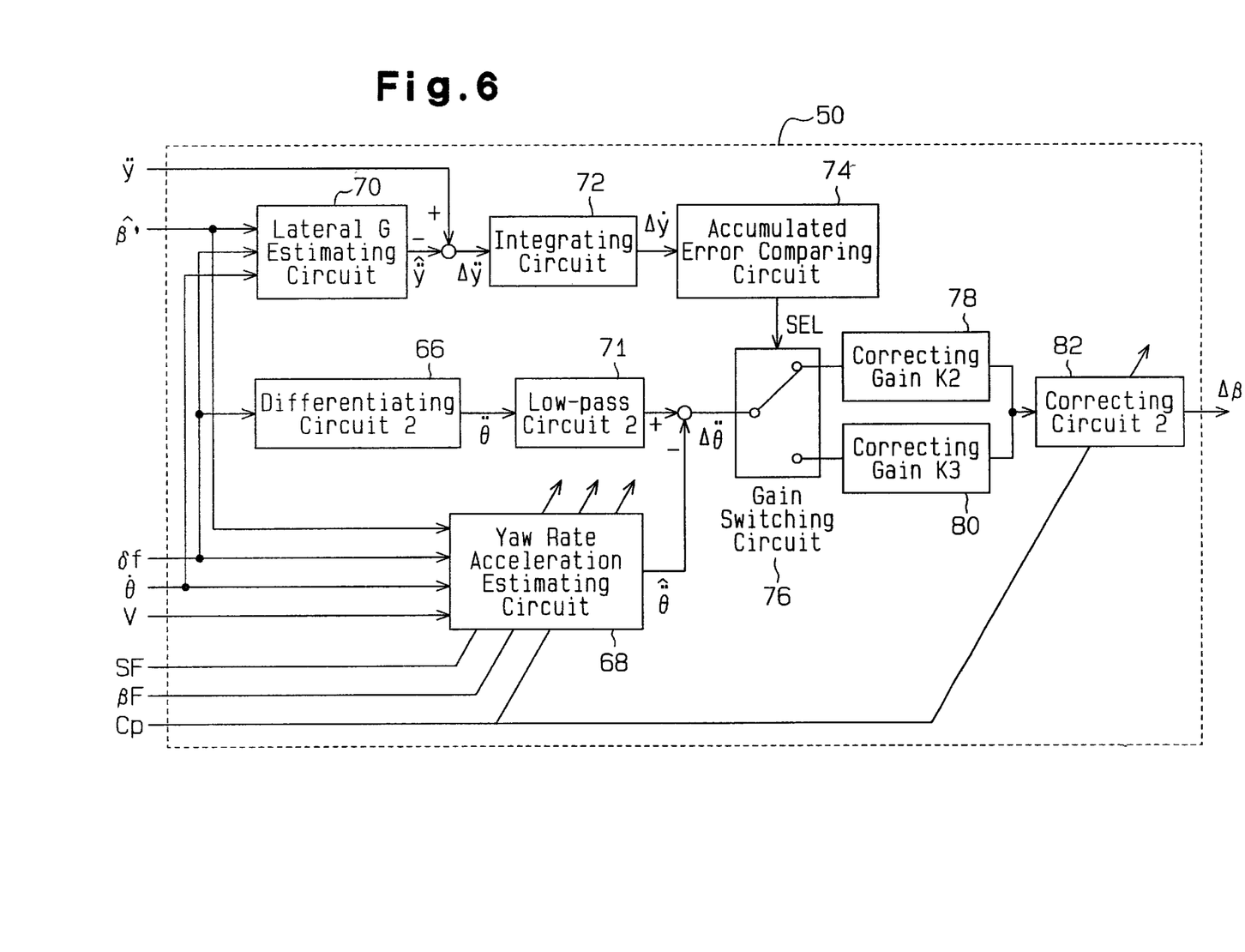
FIG. 6 is a block diagram of an abnormal turn movement correcting circuit of the circuit illustrated in FIG. 4.

In addition, as shown in FIG. 6, the abnormal turn movement estimating correcting circuit 50 is made up of a differentiating circuit 66, a yaw angular acceleration estimating circuit 68, a lateral G estimating circuit 70, an integration circuit 72, an accumulated error comparing circuit 74, a gain switching circuit 76, a correcting gain 78, a correcting gain 80, and a correcting circuit 82. The differentiating circuit 66 differentiates the value $\dot{\theta}$ with respect to time (t) to obtain a yaw angular acceleration $\ddot{\theta}=d^2\theta/dt^2$.

The yaw angular acceleration estimating circuit 68 calculates a yaw angular acceleration estimated value based on the motion formula into which are inputted the output of the circuit 30, the values δf, $\dot{\theta}$, V, and the tire's non-linear parameters Cp, SF, and βF. A deviation $\Delta\ddot{\theta}=d^2\Delta\theta/dt^2$ is calculated between the result and the yaw angular acceleration.

The lateral G estimating circuit 70 differentiates the output of the circuit 30 with respect to time (t) and estimates the lateral G by inputting $\dot{\theta}$ and V into the formula. A deviation or error between the estimated lateral G and the detected value $\ddot{y}$, expressed as a formula of $\Delta\ddot{y}=d^2\Delta y/dt^2$ is calculated to be outputted to the integrating circuit 72.

The integrating circuit 72 integrates, by means of pseudo-integration, the lateral G error $\Delta\ddot{y}$ with respect to time (t) and the resultant $\Delta\dot{y}=d\Delta y/dt$ is outputted to the accumulated error comparing circuit 74.

The accumulated error comparing circuit 74 compares the absolute value of the obtained resultant $\Delta\dot{y}=d\Delta y/dt$ with a threshold value. If the result indicates that the former is equal to or less than the threshold value (greater than the threshold value), the circuit 74 issues a signal SEL to the gain switching circuit 76 to select the correction gain K2 (K3).

The outputted yaw angular acceleration error of the low-pass circuit 71 which is represented by $\Delta\ddot{\theta}=d^2\Delta\theta/dt^2$ is switched to either of the corrections gains K2 and K3 depending on the signal SEL from the circuit 74. A product of the yaw angular acceleration error and the correction gain in each gain is made and is outputted to the correction circuit 82.

The correction circuit 82 calculates an abnormal turn movement condition estimated value based on the aforementioned result or product, the tire's non-linear parameter Cp, the yaw inertia moment I, the distance between the center of gravity and the front wheel Lf, and the distance between the center of gravity and the rear wheel Lr.

Referring back to FIG. 4, the abnormal turning condition judging circuit 52 judges, on the basis of the lateral G model value issued from the tire characteristics determining circuit 32, whether or not the turning condition is abnormal and outputs a result signal SPIN to the correction switching circuit 54.

The correction switching circuit 54 selects and outputs, depending on the resulting signal SPIN, either of the correction values Δβ of the normal condition correcting circuit 48 and the correction values Δβ of the abnormal turning condition correcting circuit 50.

Thus, the circuit 30 issues the estimated vehicle-body sideslip angle in response to the tire characteristics which depends on the tire non-linearity and road surface slip condition. It is to be noted that the details of the circuit 30 are described in the aforementioned Japanese Unexamined Publication No. Hei. 9(1997)-311042 and are thus known to skilled artisans.

The estimated value outputted from the circuit 30, i.e., the vehicle-body sideslip angle estimated value $\hat{\beta}$ on the basis of vehicle model considering the road surface slip condition, is fed to a differentiating device 12 as shown in FIG. 1. The differentiating device 12 differentiates the vehicle-body sideslip angle estimated value $\hat{\beta}$ to obtain a slip angular velocity $\dot{\hat{\beta}}$ and the resultant slip angular velocity $\dot{\hat{\beta}}$ is fed to a subtracting device 13. At this time, if the vehicle is running on a slanted, sloping or banked road, in addition to the original lateral acceleration $\ddot{y}$, the gravity acceleration depending on the degree of the slope or bank cant is applied to the vehicle, resulting in that the vehicle-body sideslip angle estimated value $\hat{\beta}$ issued from the circuit 30 is expected to include a DC component which follows the slope or bank. However, such a DC component is eliminated by being differentiated at the differentiating device 12, which makes it possible to obtain the sideslip angular velocity with high precision.

On the other hand, the values $\ddot{y}$, $\dot{\theta}$, and V are fed to the circuit 14 which detects the slip angular velocity. It is to be noted, as will be described in more detail later, that at an initial stage the subtracting device 28 is fed with the lateral acceleration $\ddot{y}$ only from the sensor.

Figure 7:
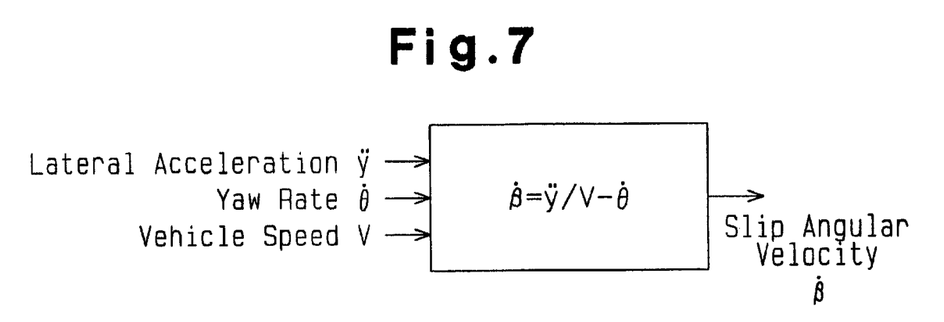
FIG. 7 is a functional block diagram of a slip angular velocity calculating circuit of the device illustrated in FIG. 1.
Figure 8:
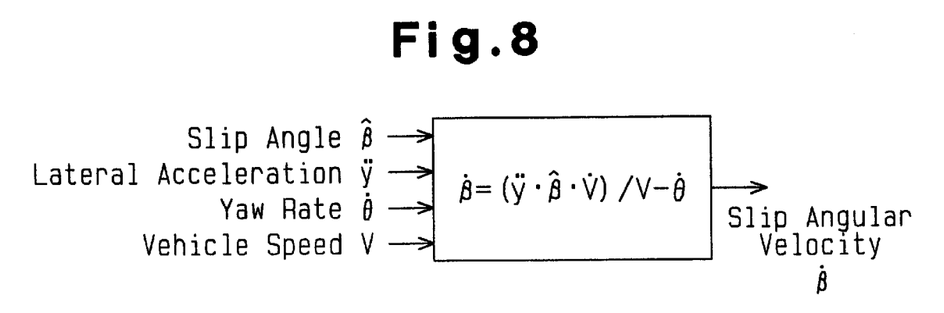
FIG. 8 is another functional block diagram of a slip angular velocity calculating circuit of the device illustrated in FIG. 1.

Referring to FIG. 7, which illustrates in a functional block diagram form the slip angular velocity calculating circuit 14, it is seen that the slip angular velocity calculating circuit 14 is inputted with or supplied the values $\ddot{y}$, $\dot{\theta}$, and V, and outputs the slip angular velocity $\dot{\beta}=\ddot{y}/V-\dot{\theta}$. If the vehicle is running along a road that is sloped or banked, the value $\ddot{y}$ includes a DC component of gravity, which results in that inevitably the DC component due to the slope or bank, as an offset, is included in the slip angular velocity $\dot{\beta}$. The resulting slip angular velocity $\dot{\beta}$ is fed to the subtracting device 13 as shown in FIG. 1. If the vehicle speed is constant, the slip angular velocity calculating circuit 14 having the control factors illustrated in FIG. 7 causes no problem. However, if the vehicle speed changes, as illustrated in FIG. 8, it is preferable that the control takes into consideration the acceleration in addition to the aforementioned control factors. That is, it is preferable to obtain the slip angular velocity $\dot{\beta}$ using the formula $\dot{\beta}=(\ddot{y}-\dot{\beta}\cdot\dot{V})/V-\dot{\theta}$.

In the subtracting device 13, a deviation is calculated between the high accuracy slip angular velocity $\dot{\hat{\beta}}$ and the slip angular velocity $\dot{\beta}$ obtained at the circuit 14. As explained above, $\dot{\hat{\beta}}$ does not include the DC component which follows the slant or bank and thus is indicative of a highly accurate slip angular velocity, while $\dot{\beta}$ does include the DC component following the slant or bank. Thus, performing such a calculation of the deviation makes it possible to extract only the slip angular velocity which results from the DC component following the slant or bank, or the gravity acceleration component caused by the slant or bank.

An output of the subtracting device 13 or the deviation $\Delta\dot{\beta}$ is fed to the low-pass filter 16 for eliminating its high frequency component and thereafter is fed to a banked or laterally slanting road detecting circuit 18. At the bank detecting circuit 18, depending the value or magnitude of the deviation $\Delta\dot{\beta}$, the bank or lateral slope of the road is determined. That is, the larger the bank or slope of the road, the larger the deviation $\Delta\dot{\beta}$. The road is thus found to be banked or laterally sloping when a comparator indicates that the deviation $\Delta\dot{\beta}$ exceeds a threshold value.

Figure 9:
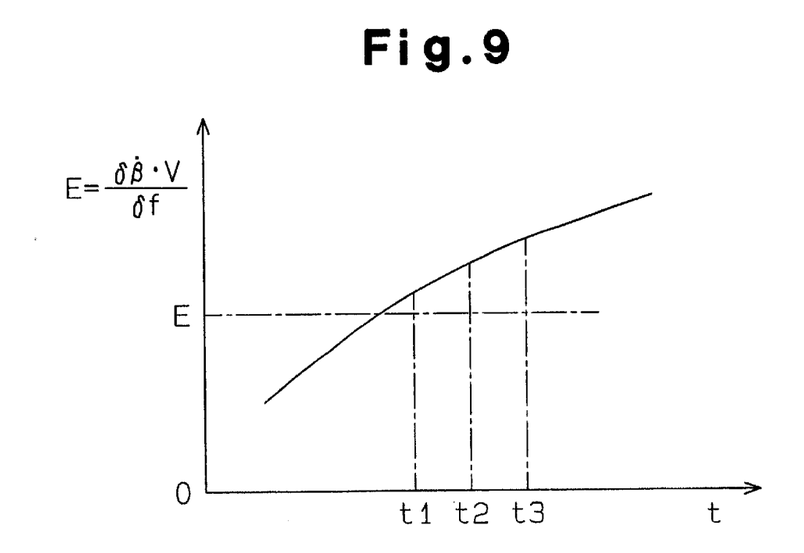
FIG. 9 is a graph indicating the operation of a bank road detecting circuit of the device illustrated in FIG. 1.

The following method can also be employed to determine with relatively high accuracy whether or not the road is banked or sloping. FIG. 9 illustrates the change of $E=\Delta\dot{\beta}\times V/\delta f$, which is in proportion with $\Delta\dot{\beta}$, with the passage of time. In the graph, the x-axis denoted time (t) while the y-axis denotes E. When the vehicle begins to run along the banked road or the road with a lateral slope, E increases with the passage of time. If a comparator recognizes that E exceeds a set threshold value $E_0$, an integration is made at each time instant t1, t2, t3 . . . to calculate the corresponding value E(t1), E(t2), E(t3) . . . i.e., an integration of error. The steeper the bank or lateral slope of the road, the shorter the integration value reaches the set value, which makes it possible to detect even a relatively steep bank of the road very quickly almost without being influenced by noise.

In addition, in general, a banked road or a laterally sloped road is relatively gentle in bank or slope, which leads to a constant gravity acceleration being included in the lateral acceleration $\ddot{y}$ and the frequency area is in substantially the DC area. Thus, even though the frequency of the low-pass filter 16 is low, no problem occurs. However, if the frequency of the low-pass filter 16 is extremely low, a delay may occur in response and so it is desired that the frequency of the low-pass filter 16 be at a higher level, preferably about 0.05 Hz.

The bank detecting circuit 18, upon detection of the banked road or the lateral slope of the road as explained above, issues a detection signal to a switching device 20 as shown in FIG. 1.

On the other hand, $\dot{\theta}$ and V are inputted to a multiplying device 22. The multiplying device 22 determines the product of $\dot{\theta}$ and V, and the resultant product is fed to a subtracting device 24 to which the lateral acceleration $\ddot{y}$ is fed. In the subtracting device 24, a subtraction $\ddot{y}-\dot{\theta}\times V$ is made. As previously mentioned, when the vehicle travels along the banked or laterally sloping road, the lateral acceleration $\ddot{y}$ includes a DC component of gravity component which depends on the slope or bank of the road. If such lateral acceleration $\ddot{y}$ is subtracted by $\dot{\theta}\times V$, only such DC component can be extracted. The deviation is fed to a low-pass filter so as to delete its higher frequency component and thereafter is fed to the switching device 20 as a DC error component $\Delta\ddot{y}$ resulting from the bank or slope.

In the present embodiment, the deviation $\Delta\ddot{y}$ of the lateral acceleration is fed to the switching device 20 and such deviation is fed to the subtracting device 28 for the correction of the sensor detected lateral acceleration $\ddot{y}$ only when the bank detecting circuit 18 detects that the vehicle is now running along a banked road or a road with a lateral slope. This results in obtaining the lateral acceleration $\ddot{y}$ with a relatively high accuracy. In other words, if the road is not a banked road but is of a low frictional coefficient or low $\mu$, the banked road detecting circuit 18 does not detect the banked road condition and the switching device 20 outputs 0 to the subtracting device 28 in accordance with the control signal issued from the banked road detecting circuit 18. (In such a case, the sensor detected lateral acceleration $\ddot{y}$ fails to be corrected. The circuit 30 estimates the slip angle based on the slip condition of the road surface and thus ultimately the estimated slip angle $\hat{\beta}$ becomes a very precise value as near as the real value.) In addition, in the case of the banked road, the switching device 20, according to the control signal from the circuit 18, issues the deviation $\Delta\ddot{y}$ of the lateral acceleration to the subtracting device 28 to subtract the same from the detected lateral acceleration $\ddot{y}$, i.e., such subtraction is made for calculating the real lateral acceleration $\ddot{y}$ by eliminating the deviation which results from the bank or lateral slope of the road. The corrected lateral acceleration ÿ is fed to the circuit 30, which makes it possible to detect the slip angle independent of or regardless of the bank or slope of the road.

Thus, in the present invention, the slip angular velocity is calculated with high accuracy so that the slip condition of the road surface such as dry or snowy is taken into consideration, detecting that the banked road is a banked road can be made with high accuracy on the basis of a deviation between the calculated slip angular velocity and the sensor detected slip angular velocity, i.e., on the basis of the error component of the slip angular velocity resulting from the bank or slope of the road, only when the banked or sloping road is detected the deviation between the product of the yaw rate and the vehicle speed and the detected lateral acceleration is used, as a DC error component due to the bank or slope of the road, for correcting the lateral acceleration. Thus, regardless of the road surface condition, it becomes possible to detect with high accuracy whether the road is a banked or laterally sloping road. The result is that on both flat and banked roads, vehicle-body lateral acceleration and thus vehicle-body sideslip angle can be calculated or detected with very high accuracy.

In addition, in the present embodiment, if the tire slips while the vehicle is running along banked or laterally sloping road, the deviation Δÿ includes the error component due to the bank or slope and the error component due to the slip. This causes the switching device 20 to feed the deviation Δÿ to the subtracting device 28 for the correction, resulting in that obtaining correct lateral acceleration ÿ may not be established. However, as a practical matter, such a problem is not of significance due to the fact that the foregoing vehicle running mode is relatively rare.

It is to be noted that the circuit 30 can take another form other than the structure illustrated in FIGS. 2–4 inclusive.

Figure 11:
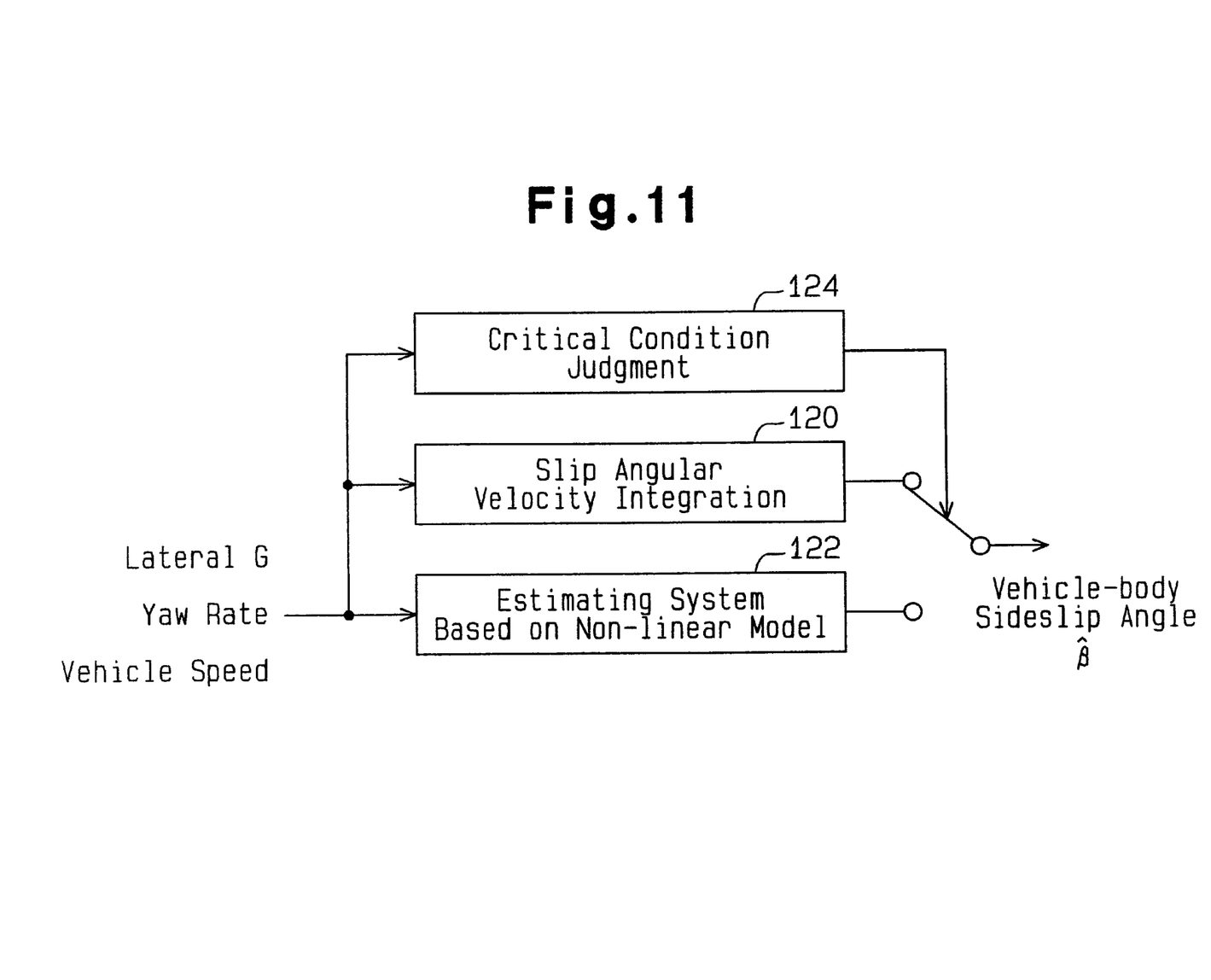
FIG. 11 is a block diagram of another vehicle-body sideslip angle estimating circuit of the device illustrated in FIG. 1.

Referring to FIG. 11, another mode of the circuit 30 includes an integrating system 120 which calculates slip angular velocity by integration and an estimating system 122 based on a non-linear model. The integrating system 120 estimates the lateral sideslip angle based on the sensor detected lateral G ÿ, yaw rate θ̇, and vehicle speed V, while the estimating system estimates the lateral sideslip angle based on the sensor detected lateral G ÿ, yaw rate θ̇, steering angle δf and vehicle speed V. Due to the fact that the estimated value outputted from the integrating system 120 includes an integrating error, the lateral sideslip angle is estimated by the estimating system 122 until the critical condition, which makes it possible to make an estimation on the basis of the nonlinear model with very high accuracy. When the critical condition is attained after which the non-linear model becomes invalid, estimating vehicle-body sideslip angle switches from the estimating system 122 to the integrating system 120. For establishing such a switching, a critical condition judging device 124 is provided.

Figure 12:
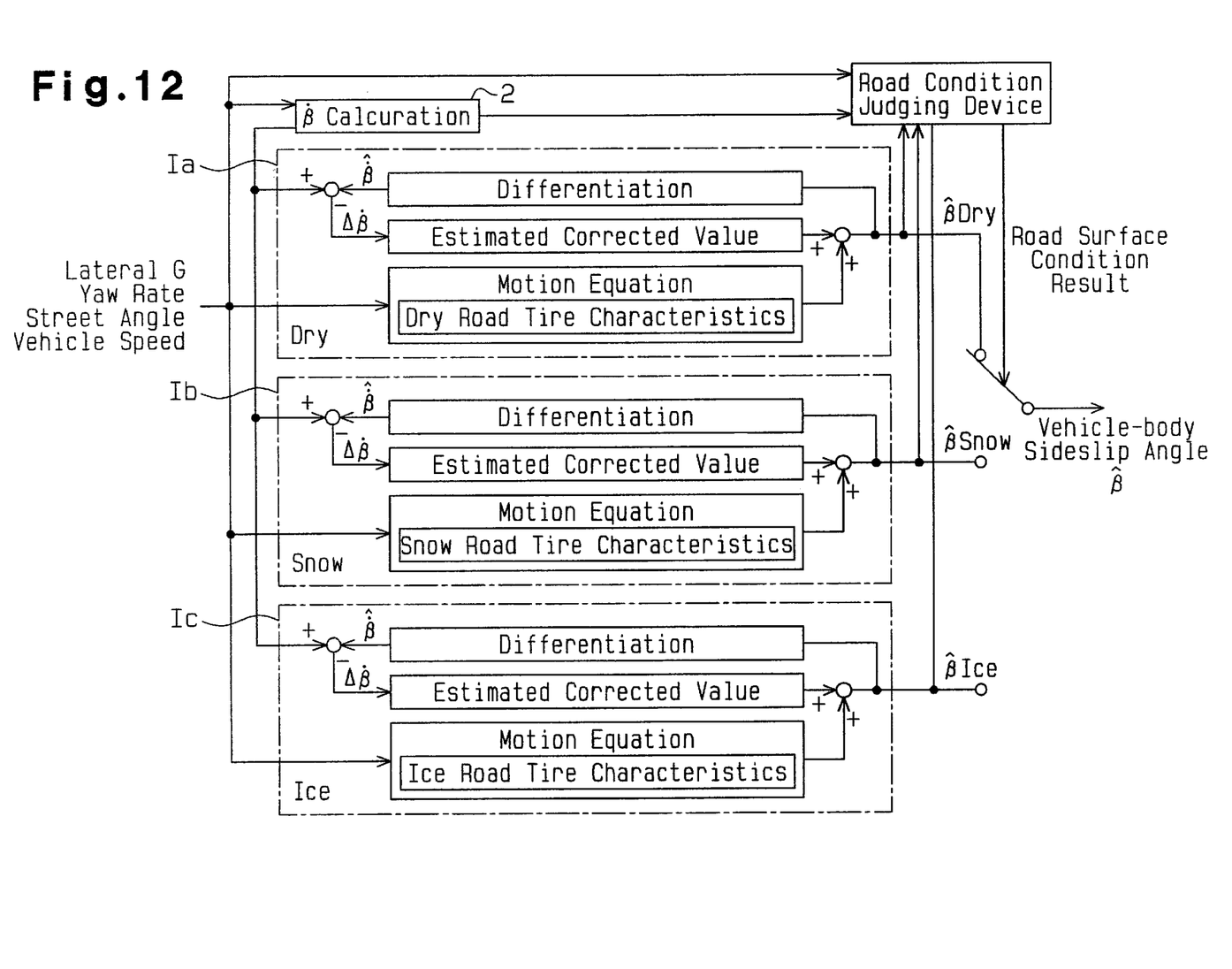
FIG. 12 is a block diagram of an estimating system based on a non linear model of the circuit illustrated in FIG. 11.

FIG. 12 illustrates in a block diagram form the estimating system 122 based on the nonlinear model. The basic concept or operating principle is disclosed in more detail in Japanese Unexamined Patent Publication Hei. 9(1997)-311042 and is thus known. The sensor detected ÿ, yaw rate θ̇, steering angle δf and vehicle speed V are fed to each of a slip angle estimation portion 1a for dry road surface, a slip angle estimation portion 1b for snowy road surface, and a slip angle estimation portion 1c for ice-covered road surface. The slip angle estimation portions 1a, 1b, 1c estimate the sideslip angles based on motion equations using tire characteristics (nonlinear tire characteristics) on the respective dry, snowy, and ice-covered road surfaces. Then, the estimated sideslip angle values β̂-Dry, β̂-Snow, and β̂-Ice are outputted after being added with correction values Δβ.

To describe in more detail, for example in the slip angle estimation portion 1a for a dry road surface, according to the lateral motion formula of vehicle-body, the sideslip angle can be determined as follows:

$$\hat{\beta}' = -\{m\ddot{y} + (Cf \cdot Lf - Cr \cdot Lr)\dot{\theta}/V - Cf \cdot \delta f\}/(Cf + Cr)$$

where m: mass of vehicle-body
ÿ: lateral acceleration
Cf: cornering power of front wheel
Cr: cornering power of rear wheel
Lf: distance between front axle and center of gravity
Lr: distance between rear axle and center of gravity
θ̇ yaw rate
V: vehicle speed
δf: steering angle A correction value Δβ is added to the result of the above-noted calculation to eliminate errors resulting from load shift according to vehicle rolling movement and modeling error in tire characteristics. To obtain or calculate the aforementioned correction value Δβ, the following formula is used.

$$\Delta\beta = -K \cdot m \cdot \Delta\dot{\beta}/(Cf+Cr)$$

where K: constant of low-pass filter
Cf: cornering power of front wheel
Cr: cornering power of rear wheel
m: mass of vehicle-body
Δβ̇: deviation between β̇ obtained at sideslip angular velocity calculating portion 2 and β̇ which is the deviated value of feedback estimated sideslip angle with respect to time.

Then, on the basis of the result of the road surface judging portion, one of the estimated values β̂-Dry, β̂-Snow, and β̂-Ice outputted form the respective portions 1a, 1b, and 1c. Tire characteristics are defined for each of the dry, snowy, and ice-covered road surfaces. A residual between the detected value ÿ and each of the calculated values of ÿ is obtained. Then, the road surface having the minimum residual is regarded as the instant road surface or the road surface at issue.

On the other hand, during critical running of the vehicle, all tires slip, resulting in that the cornering forces become saturated. Thus, the calculated lateral acceleration ÿ based on the tire's non-linear characteristics at the critical condition judging device 124 becomes very much larger than the sensor detected lateral acceleration ÿ and therefore is compared with a predetermined critical value to judge whether or not the vehicle is in a critical running condition. If the vehicle critical running condition is determined, a switch is made from the estimating system 122 to the integrating system 124 for outputting the estimated lateral sideslip angle β̂. It is to be noted the detailed structures illustrated in FIGS. 11 and 12 are also explained in Japanese Patent Application No. Hei. 11(1998)34984 and are thus known to skilled artisans.

Figure 10A:
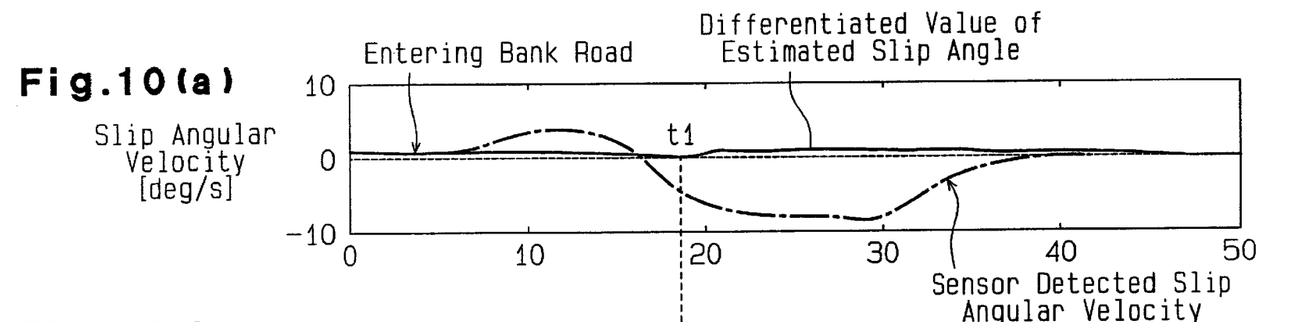
FIGS. 10(a)–(c) illustrate various timing charts.
Figure 10B:
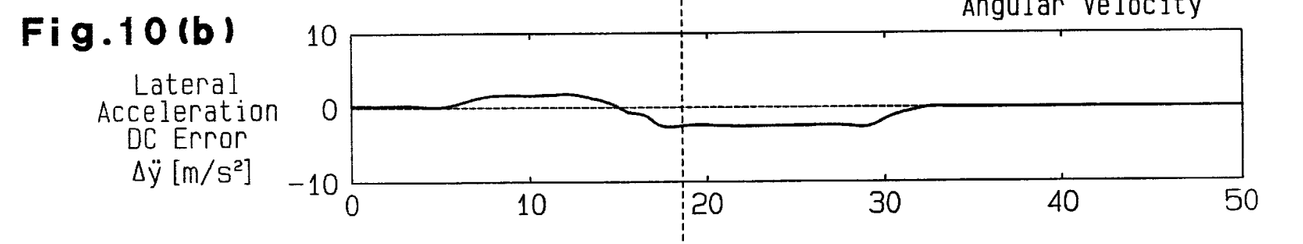
Figure 10C:
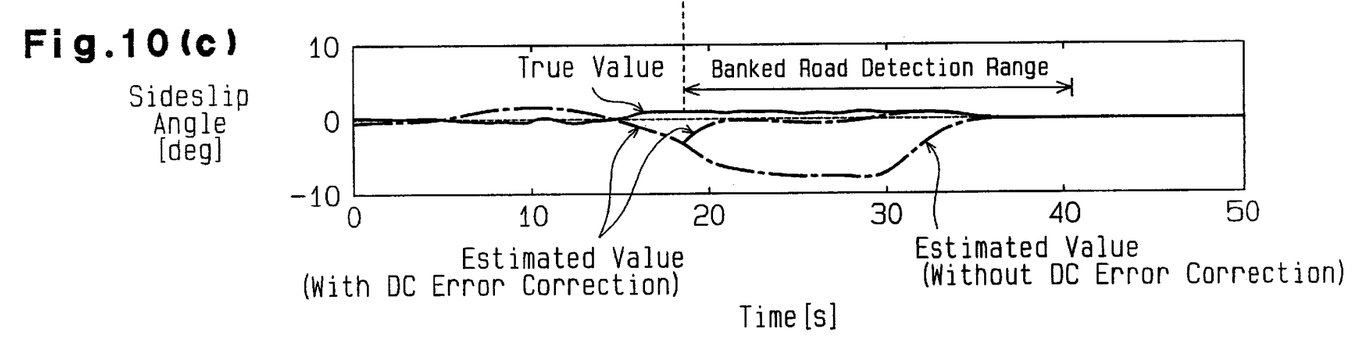

FIG. 10 illustrates the results of the correction of lateral acceleration ÿ and estimation of the vehicle-body sideslip angle which are established by the present embodiment.

FIG. 10(a) shows how the vehicle-body sideslip angle (slip angular velocity obtained from sensor values) changes with the passage of time which is obtained by the sensor detected lateral acceleration ÿ and vehicle speed V. In addition, there is also shown how the slip angular velocity (differentiated value of the estimated slip angle) changes with the passage of time which is obtained in the differentiating device 12 by differentiating the slip angle which is estimated at the circuit 30. In the drawing, the x-axis and y-axis denote time and slip angular velocity (deg./sec.), respectively. While the vehicle is running along a flat road, both are same or in coincidence with each other. However, when the vehicle runs on a banked or laterally sloping road, a deviation occurs therebetween due to the fact that the slip angular velocity obtained from the sensor values includes slip angular velocity corresponding to the gravity acceleration component resulting from the road slope. If such a deviation exceeds a set value, the road is found to be or determined to be a banked or sloping road. In the drawing, at a time instant t1, the banked or laterally sloping road is recognized.

FIG. 10(b) shows how the lateral acceleration deviation Δÿ changes with the passage of time, with the x-axis and y-axis denoting time and Δÿ (m/sec²), respectively. The lateral acceleration deviation Δÿ is the gravity acceleration component which depends on the slope or banked nature of the road, is regarded as the error of the proper vehicle-body's lateral acceleration deviation Δÿ, and is said to be DC error. While the vehicle runs along a flat road surface, the deviation remains zero. However, as soon as the vehicle begins to run along a banked or laterally sloping road, the vehicle-body's lateral acceleration deviation Δÿ is generated due to the fact that the vehicle-body is applied with the gravity acceleration component.

FIG. 10(c) shows, in the one-dotted line illustration, how the estimated vehicle-body sideslip angle at the circuit 30 changes with the passage of time which is calculated on the basis of the corrected lateral acceleration ÿ which is obtained by subtracting the lateral acceleration deviation Δÿ as can be seen from FIG. 10(b) from the detected lateral acceleration ÿ at FIG. 10(a). In FIG. 10(c), the x-axis and y-axis denote time (s) and sideslip angle (deg), respectively. In the drawing, for comparison purposes, the true value and the estimated sideslip angle at the circuit 30 which is obtained based on the detected lateral acceleration ÿ as it is without correction at the subtracting device 28 are illustrated as a bold line and a two-dotted line, respectively. As soon as the vehicle begins to run on a banked or laterally sloping road surface, the estimated value begins to shift from the true value and continuing the estimation based on the non-corrected lateral acceleration ÿ the aforementioned shift become much larger due to the DC error component included in the non-corrected lateral acceleration ÿ (see the two-dotted line). However, at a time instant t1 at which the banked or laterally sloping road is detected, the lateral acceleration ÿ becomes possible being as near as the true value and therefore the estimated sideslip angle based thereon becomes possible being as near as the true value or a very accurate value (see the one-dotted line).

In addition, the circuit 30 can estimate the sideslip angle on the assumption of steady circular turning motion model as follows.

$$\beta = \{1/(1+T \cdot s)\} \cdot \{(1-B \cdot V^2)/(1-A \cdot V^2)\} \cdot \delta f$$

where T: filter constant giving vehicle dynamic characteristics,
s: Laplace operator,
A, B: vehicular constants each of which depends on, for example, tire characteristics and vehicle-body mass,
V: vehicle speed,
δf: steering angle.

In this formula or equation, adjusting A and/or B depending on the road surface slip condition makes it possible to estimate the sideslip angle with very good accuracy, which makes it possible to realize a banked road. Using observers for the estimation is also permitted. In either case, taking into consideration the road surface slip condition makes it possible for the circuit 30 to estimate the sideslip angle with very good accuracy.

In addition, in the present embodiment, when the banked road detecting circuit 18 detects the banked or laterally sloping road, the detected lateral acceleration ÿ is corrected by subtracting with the deviation Δÿ. However, other methods are also possible. For example, the road slope or inclination angle φ can be measured by the following formula.

$$\phi = \cos^{-1}(Gz/g)$$

where Gz: detected gravity acceleration measured by an on-vehicle G sensor,
g: gravity acceleration (9.8 m/s²) on a flat road surface.

The detected lateral acceleration ÿ can be corrected by being multiplied with cos φ.

As explained above, in accordance with the present invention, it is possible to detect vehicle running condition quantities such as the vehicle-body sideslip angle, with very good accuracy, regardless of the road surface condition.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle driving condition detection device comprising:
    vehicle-body sideslip angle estimating means for estimating a vehicle-body sideslip angle based on a vehicle motion model which depends on road surface slip condition;
    detecting means for detecting whether or not the vehicle is running on a sloping road based on a deviation between a detected slip angular velocity and a calculated slip angular velocity on the basis of the estimated vehicle-body sideslip angle estimated by the vehicle-body sideslip angle estimating means; and
    correction means for correcting a detected lateral acceleration when the detecting means detects that the vehicle is running on the sloping road.

2. A vehicle driving condition detection device as set forth in claim 1, wherein the vehicle-body sideslip angle estimating means estimates the vehicle-body sideslip angle on the basis of the corrected lateral acceleration determine by the correction means.

3. A vehicle driving condition detection device as set forth in claim 1, wherein the detection means includes: a differentiating device in which the estimated vehicle-body sideslip angle determined by the vehicle-body sideslip angle estimating means is differentiated with respect to time; a slip angular velocity detecting device which detects a slip angular velocity on the basis of the detected lateral acceleration, a detected yaw rate, and a detected vehicle speed; a subtracting device which performs a subtraction between a slip angular velocity calculated by the differentiating device and the slip angular velocity detected by the slip angular velocity detecting device; and a comparing device which makes a comparison between the deviation calculated by the subtracting device and a threshold value.

4. A vehicle driving condition detection device as set forth in claim 1, wherein the correction means corrects the lateral acceleration in such a manner that a deviation between the detected lateral acceleration and a product of the detected yaw rate and the detected vehicle speed is subtracted from the detected lateral acceleration.

5. A vehicle driving condition detection device as set forth in claim 1, wherein the correction means corrects the detected lateral acceleration on the basis of a gravity acceleration along a vehicle vertical direction.

* * * * *